INVENTORS
BERNARD A. LOOMANS
DAVID B. TODD

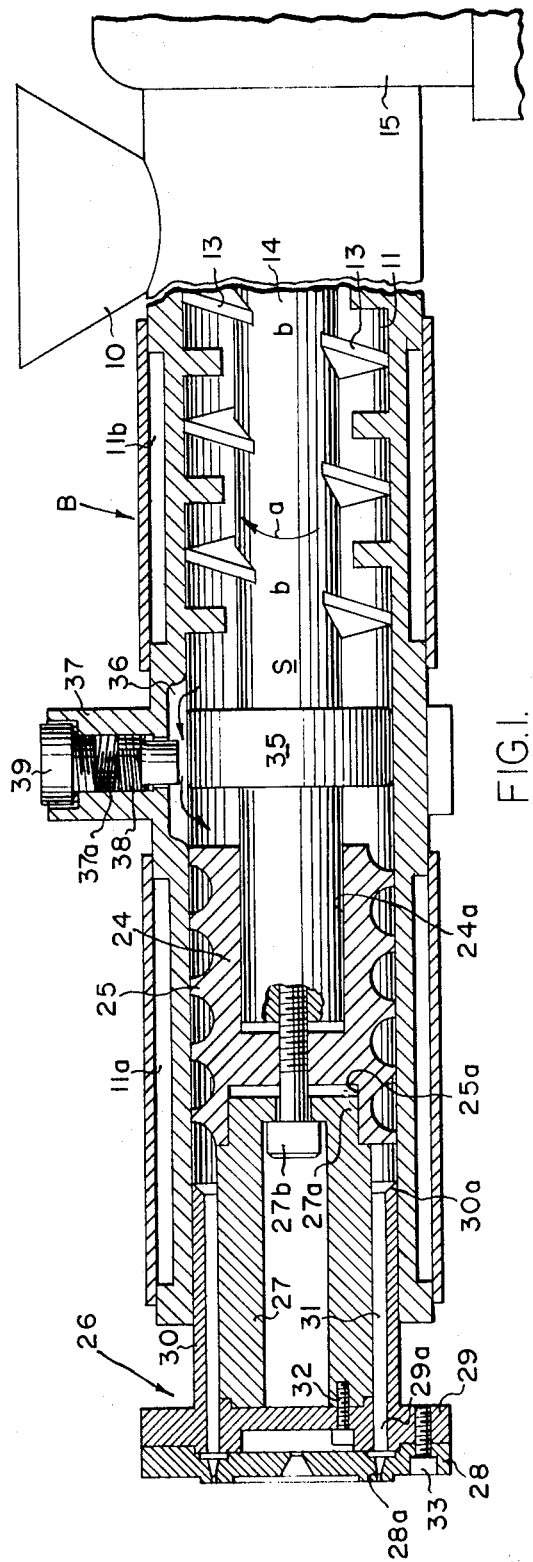

United States Patent Office 3,613,160
Patented Oct. 19, 1971

3,613,160
VARIABLE BYPASS ORIFICE FOR CONTINUOUS MIXER
Bernard A. Loomans and David B. Todd, Saginaw, Mich., assignors to Baker Perkins Inc., Saginaw, Mich.
Filed Nov. 24, 1969, Ser. No. 879,446
Int. Cl. B29f 3/02
U.S. Cl. 18—12 SA
3 Claims

ABSTRACT OF THE DISCLOSURE

A mixer, including a barrel having a passage therethrough in which is accommodated a reciprocating and rotating mixer shaft. An annular ring or plug mounted on the shaft closes the passage to the flow of material therethrough and a bypass orifice of variable size connects the passage portions on opposite sides of the ring. Externally adjustable means is operable during operation of the mixer shaft to vary the size of the orifice and control the flow of material therethrough and the holdback of material therein.

---

One of the prime objects of the invention is to provide apparatus to control the flow of plastic material through a mixer or kneader and the retention time of the material in the machine to achieve the optimum processing thereof.

Another object of the present invention is to provide variable apparatus to control the flow of plastic material through a mixer which can be operated while the mixer is processing material.

Still another object of the present invention is to provide a mixer, having a rotating, reciprocating screw for mixing and feeding plastic material which has a variable orifice that can be varied by an externally accessible control while the screw is in operation and which does not increase the thrust load on the driving screw.

A further object of the invention is to provide a continuous mixer or kneader which permits faster startups, promotes easier flushing between grades of polymer being processed, and permits a greater range of polymers to be handled without stopping the machine.

A continuous mixer constructed in accordance with the present invention includes a barrel having a kneading chamber communicating with inlet means through which material to be mixed is supplied, a mixer shaft extending axially in the chamber, means for relatively revolving and reciprocating the barrel and mixer shaft to advance material forwardly from the inlet means through the mixing chamber in an axial direction, and means for variably controlling the discharge of material from the chamber.

Other objects and advantages of the invention will become apparent from the following description and the accompanying drawings, in which:

FIG. 1 is a sectional, side elevational view of the apparatus;

FIG. 2 is a slightly reduced, fragmentary, sectional, elevational view, showing the mixer shaft turned end-for-end and illustrating the manner in which the mixer shaft is driven;

Figure 4:
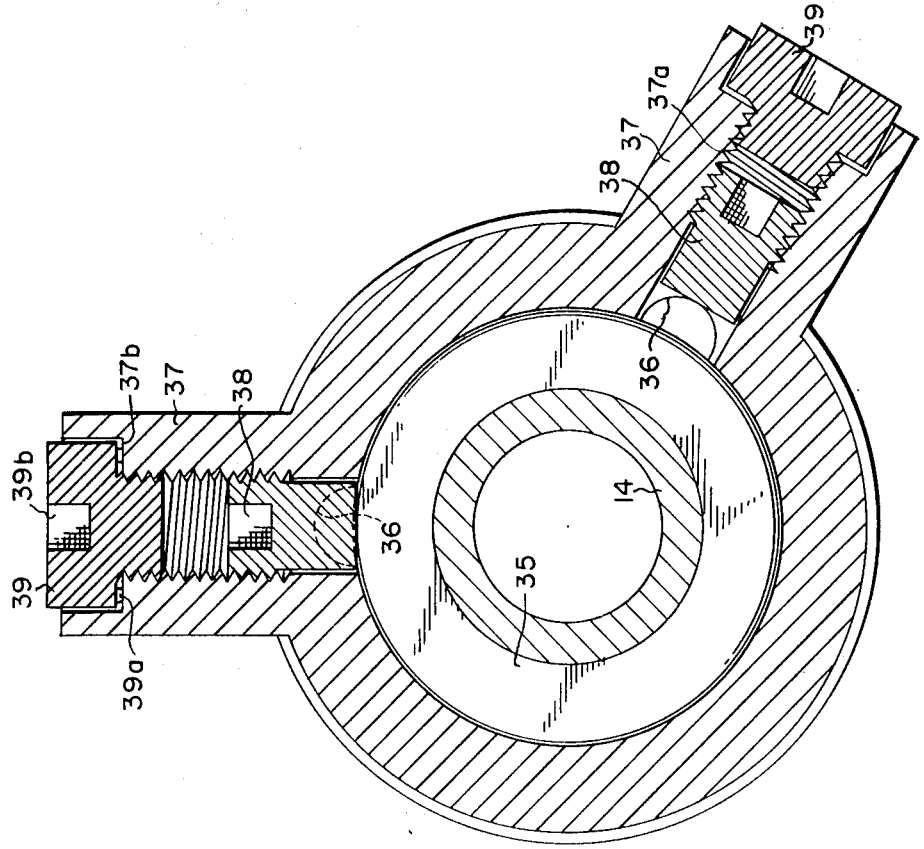
FIG. 4 is a cross sectional view taken on the line 4—4 of FIG. 3.

In the illustrative embodiment of the invention, reference character B generally indicates a jacketed, tubular mixing barrel having annular passages 11a and 11b for circulating a heating or cooling fluid, depending on the mixing operation to be performed. A mixer of this general character is disclosed in U.S. Pat. No. 3,023,455, granted Mar. 6, 1969, to Herbert F. Geier and Henry F. Irving, and U.S. Pat. No. 3,362,044, granted Jan. 9, 1968, to Henry F. Irving. The present apparatus similarly includes a feed hopper 10 leading into the chamber, passage, or bore 11 of the barrel B for admitting the ingredients to be mixed to the passage 11. Provided in the barrel B are circumferentially spaced, radially inwardly projecting teeth or lugs 12 of the character disclosed in the patents mentioned, which cooperate with interrupted helical threads or blades 13 provided on a portion 14 of a mixer shaft S in helical formation in a manner to achieve the intimate blending and kneading of the material introduced to the passage 11. The threads or blades 13 are so pitched that, if the shaft S is revolved in a clockwise direction as viewed from the right end of the machine (see the arrow a), the material will be moved forwardly from right to left. The shaft S is reciprocated axially in timed relation with its rotation and the disposition of the teeth 12 is such that, during the axial sroke of the shaft S, the teeth 12 pass through the spaces b between the interrupted blades 13. If the blades 13 are interrupted at 180° intervals by the spaces b, the shaft must rotate 180° during both the forward and rearward portions of the reciprocatory stroke.

A housing 15, rearwardly of the feed hopper 10, is provided with a pair of fixed cam follower projections 16 which ride in cam tracks 17 provided in a pair of side-by-side cams 18 which are keyed to the rear end of the mixer shaft S. As the shaft S is revolved by a motor (not shown) through a suitable gear reduction unit (not shown), the rotary travel of the cams 18 causes the shaft to have an axial reciprocating stroke.

At its rear end, the shaft S is supported by bearings 21 which are mounted in the housing 15. Fixed to the shaft S to revolve and reciprocate with it are slide bearings 20 and 21a. A gear 22, keyed as at 22a to the rear slide bearing 21a, is connected through a suitable gear reduction unit (not shown) to the drive motor and drives the sleeve 21a and the shaft S at the desired speed in terms of revolutions per minute. The gear reduction unit and motor may be housed in a suitable casing portion 23.

At the forward end of the shaft portion 14 is mounted an advancing screw section 24, forming part of the mixer shaft S, and having flights 25 which move the plasticized materials forwardly when the shaft S is revolved in the direction a. The screw section 24 has a bore 24a within which the end of the shaft portion 14 is received. Mounted on the forward end of the advancing screw section 24 is an extruding head assembly generally designated 26, also forming part of the mixer shaft S, and which includes a sleeve member 27 having a reduced end portion 27a received in a recess 25a formed in the front end of the screw section 24 and secured by a bolt 27b which extends into the shaft section 14.

A pair of die assembly plates 28 and 29 cooperate to discharge the mixed material from the mixer in the form of strands and are provided with material expressing, communicating, circumferentially spaced passages 28a and 29a, respectively. The plate 29 has a rearwardly extending sleeve extension 30 which is mounted for reciprocating and rotating movement in the barrel chamber or bore 11, and which is spaced from the sleeve 27 to provide an annular passage 31 leading to the extruding passages 28a and 29a. The rear edge of the sleeve extension portion 30 is beveled as at 30a to direct the plasticized material inwardly to the chamber 31. Bolts 32 may be provided to secure the plate 29 to the sleeve 27 and bolts 33 may be provided to secure the plate 28 to the plate 29. Because the chamber 31 reciprocates with the screw section 24 and the shaft section 14, material is expressed through the exit passages 28a and 29a in a steady stream, rather than in a pulsating stream.

Mounted on the shaft portion 14 between the section with blades 13 and the screw section 24 is an annulus or ring 35 having an outside diameter substantially equal to, but slightly smaller than, the diameter of the passage 11 except for proper clearance provisions. Adjacent the ring 35, the barrel B is provided with a pair of supplemental orifice or bypass grooves 36 extending axially beyond both the front and rear sides 35a and 35b, respectively, of the ring 35 so that the supplemental grooves 36 are not blocked by the ring 35 when it is in either of the extreme ends of its stroke. Extending radially outwardly of each bypass groove 36, and forming a part of the barrel housing B, is a housing 37, having a threaded bore 37a therethrough communicating with the associated bypass groove 36. A control plug 38 is threadedly received in each bore 37a and is vertically adjustable by rotative manipulation. A socket 38a is provided in each control plug 38 to facilitate its rotation by means of a wrench. Provided for sealing each bore 37a and preventing the exit of material therethrough is a sealing screw 39. An annular seal 39a may be provided between the head of each control plug 39 and the shoulder 37b formed on housing part 37. The head of the sealing screw 39 is also provided with a socket 39b to receive a wrench which may be manipulated to back off the screw 39 to permit access to the control plug 38.

Figure 3:
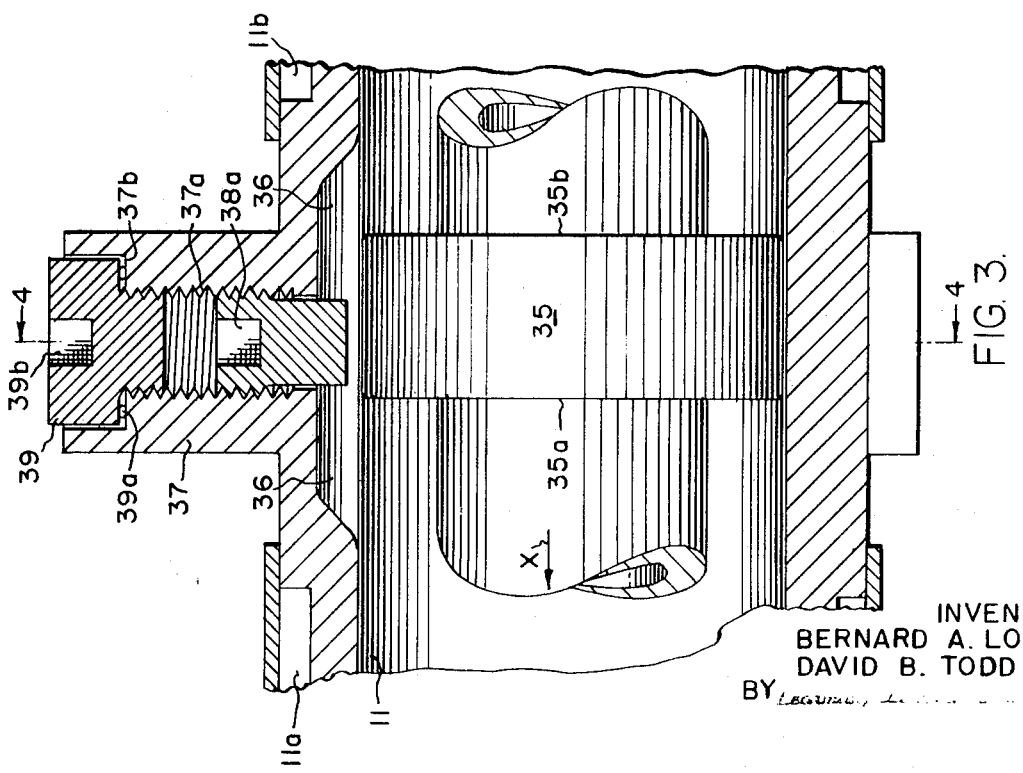
FIG. 3 is an enlarged, sectional, elevational view illustrating the variable orifice plug of the apparatus.

The inner end surface of each control plug 38 is flat so as to be freely rotatable. The control plugs 38 are movable in a radial direction to subsequently close each bypass groove 36 when in the radially innermost position shown at the top of FIG. 4, or to completely open the bypass groove as shown in the lower right hand corner of FIG. 4. In FIG. 3, the top plug 38 is shown in a partially opened position.

As disclosed in copending patent application Ser. No. 638,398, now Pat. No. 3,430,189, filed May 15, 1967, a strand cutting and pellet cooling assembly may be mounted at the discharge end of the above described apparatus adjacent the orifice plate 28, so as to receive the material as it passes through the openings 28a and 29a. Such apparatus, however, forms no part of the present invention and will not be further described.

In operation, the material to be mixed and extruded is supplied to the mixed chamber 11 through the hopper 10 in any suitable manner, but usually in particulate form and then is melted within the chamber 11 and continuously mixed and kneaded therein. Typical plastics which may be processed include both thermosets and thermoplastics such as polyethylene, polyvinyl chloride, polystyrene, and polyurethane, but many other plastics and other materials also may be processed by the apparatus. The material in chamber 11 will be maintained at the temperature desired for mixing by circulating a temperature controlling fluid medium through the barrel chambers 11a and 11b and the material will be forwarded continuously by the flights 13. Material is thus moved generally in the direction of the arrow X shown in FIG. 3 by the blade portions 13 in the material kneading portion of the chamber, but only a metered amount is permitted to move forwardly through the bypass grooves 36, the amount of material bypassing the ring 35 depending on the radial positions of the plugs 38.

Although the shaft S has been disclosed as reciprocating as well as rotating, it should be understood that control plugs of the kind shown herein can be used in mixers or extruders having a purely rotary material advancing screw. screw.

The flow of material through the mixer may be varied from essentially none, when the plugs 38 fully close the bypass grooves 36, to a maximum, when the plugs are fully retracted from the bypass grooves. Adjustment of the plugs can be made while the mixer is operating, thereby enabling very precise flow resistance to be achieved. The retention time of material in the kneading portion of the mixer may be adjusted to suit the material being processed while the machine is in operation.

It is too be understood that the drawings and descriptive matter are in all cases to be interpreted as merely illustrative of the principles of the invention rather than limiting the same in any way, since it is contemplated that various changes may be made in the various elements to achieve like results without departing from the spirit of the invention of the scope of the appended claims.

We claim:

1. A continuous mixer comprising: a barrel forming an axially extending passage having an inlet and an outlet; an axially disposed mixing shaft mounted in said passage for reciprocating and rotating movement and having interrupted helical threads forming thread portions thereon for mixing said material and moving such material toward said outlet; axially spaced lugs on the interior wall of said barrel between said threads in one position of said shaft; means for continually rotating said shaft and reciprocating said shaft with a predetermined stroke relative to said barrel to permit said thread portions to axially pass by said lugs during the forward and rearward movement of said mixing shaft; means carried by said shaft in said passage between said inlet and said outlet for substantially restricting said passage; axially extending bypass passage means in said barrel communicating with said chamber and adjacent to and spanning said restricting means and being of an axially predetermined length relative to said stroke to always span said restricting means and permit the flow of material therethrough; and control means for varying the size of said bypass passage means to vary the rate of flow of material to said outlet and including radially movable valve means for opening and closing said bypass passage means while said barrel and said mixing shaft are being relatively reciprocated and rotated and said thread portions pass by said lugs; said valve means having only a sliding clearance with said restricting means in its radially innermost position.

2. The mixer of claim 1 wherein said bypass passage means includes a plurality of circumferentially spaced, axially extending grooves spanning said restricting means; said valve means comprising a plurality of plug means, one of said plug means being mounted in each of said bypass passage means for individual radial movement between radially inner and outer positions to control the flow of material in its respective groove only.

3. The mixer of claim 1 wherein said control means comprises generally radial passage means communicating with said bypass passage means, said valve means including rotatable plug means mounted in said radial passage for movement between radially inner and outer positions, and seal plug means removably positioned in sealing engagement with said radial passage means radially outwardly of said rotatable plug means.

References Cited

UNITED STATES PATENTS

| | | | |
|---|---|---|---|
| 1,935,050 | 11/1933 | Gordon | 18—12 SA |
| 3,023,455 | 3/1962 | Geier et al. | 18—12 SA UX |
| 3,164,563 | 1/1965 | Maxwell et al. | 18—12 SN |

H. A. KILBY, JR., Primary Examiner

U.S. Cl. X.R.

18—12 B